Figure 1:
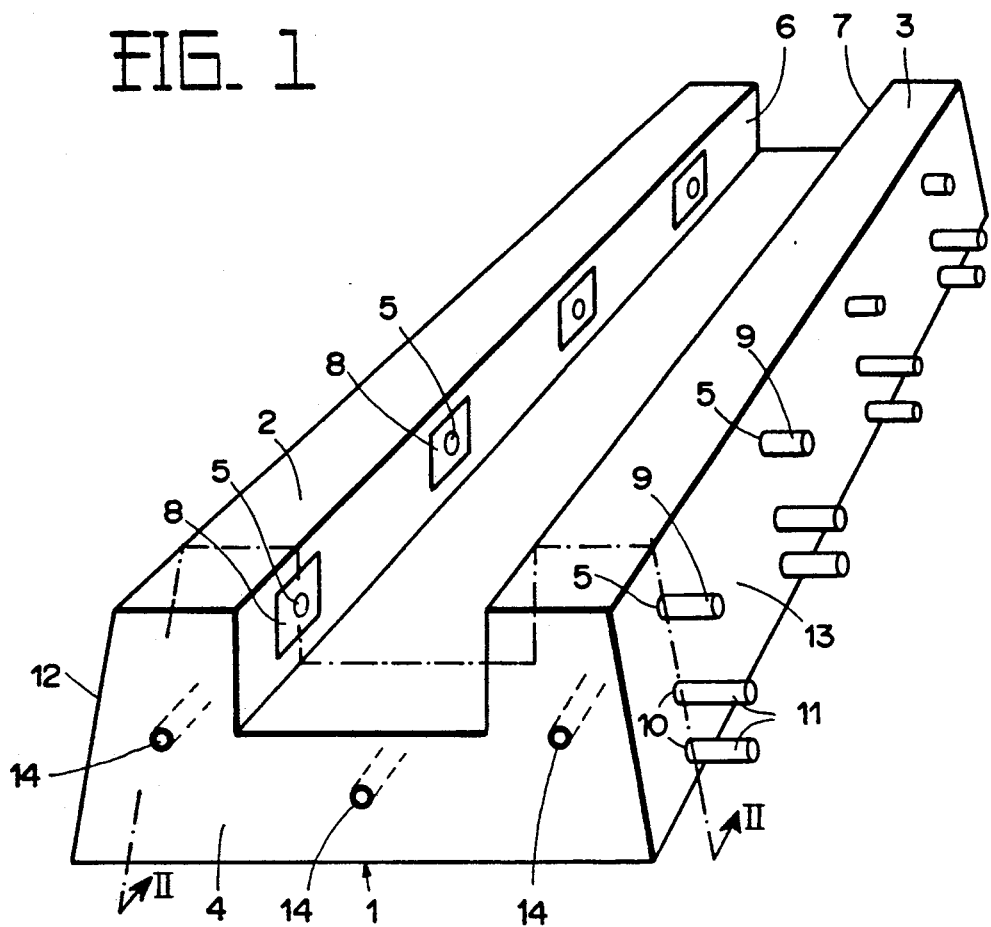

United States Patent [19]

Siegfried et al.

[11] Patent Number: 5,066,167
[45] Date of Patent: Nov. 19, 1991

[54] PRESTRESSED CONCRETE LINING IN A PRESSURE TUNNEL

[75] Inventors: Erwin Siegfried, Liebefeld; Peter Marti, Belp, both of Switzerland

[73] Assignee: VSL International AG, Bern, Switzerland

[21] Appl. No.: 640,234

[22] Filed: Jan. 11, 1991

[30] Foreign Application Priority Data

Jan. 19, 1990 [CH] Switzerland .............. 178/90

[51] Int. Cl.⁵ .............................. E21D 11/10
[52] U.S. Cl. .................. 405/150.1; 52/224; 405/153
[58] Field of Search ............... 405/126, 134, 135, 146, 405/150, 151, 152, 153, DIG. 16; 52/224; 264/31, 32, 33

[56] References Cited

U.S. PATENT DOCUMENTS

| | | | |
|---|---|---|---|
| 3,824,751 | 7/1974 | Shelander | 52/173 |
| 3,850,000 | 11/1974 | McBean | 405/153 X |
| 3,869,530 | 3/1975 | Williams | 52/224 X |
| 3,871,183 | 3/1975 | Cardwell et al. | 405/153 |
| 3,950,840 | 4/1976 | Dietrich | 52/224 X |
| 4,045,929 | 9/1977 | Dalbrenta | 52/224 |
| 4,497,590 | 2/1985 | Chase | 405/153 X |
| 4,662,773 | 5/1987 | Baumann et al. | 405/153 X |

FOREIGN PATENT DOCUMENTS

| | | |
|---|---|---|
| 1458056 | 10/1966 | France . |
| 2371562 | 6/1978 | France . |
| 304650 | 4/1955 | Switzerland . |
| 1507977 | 4/1978 | United Kingdom . |

Primary Examiner—David H. Corbin
Attorney, Agent, or Firm—Oldham & Oldham Co., Inc.

[57] ABSTRACT

The prestressed concrete lining has several reinforcement elements (32) distributed around the circumference and along the length of the pressure tunnel. There are prestressing elements (38, 39, 40, 41) which encompass at least a part of the circumference of the pressure tunnel. A bottom part (35) is disposed within the pressure tunnel, formed of several elongated anchorage bodies (15) in series. Each of the anchorage bodies (15) has an essentially U-shaped cross section. In each of the arms (2, 3) of the anchorage bodies turned towards the inside of the tunnel there are first means (5) for passing through at least one of each of the prestressing elements (38, 39, 40, 41). An bearing plate (8) is disposed on each of the facing inner surfaces of the arms in the region of each of the first pass-through means (5). Second means (10) for passing through at least one of each of the prestressing elements (38, 39, 40, 41) are foreseen in the base arm of the anchorage body 15. Each of the prestressing elements (38, 39, 40, 41) is, starting from a dead end anchor (43, 44), led through one of the second pass-through means (10) of one of the anchorage bodies (15) and, after crossing through one of the first pass-through means (5) of one of the anchorage bodies, ends in an anchor head of a stressing anchorage (42) bordering on one of the bearing plates (8). By use of the anchorage bodies a prestressed concrete lining can be simplified with respect to the state of the art. In particular, it guarantees speedy advancement in the progress of the construction. The construction time is therefore reduced.

13 Claims, 6 Drawing Sheets

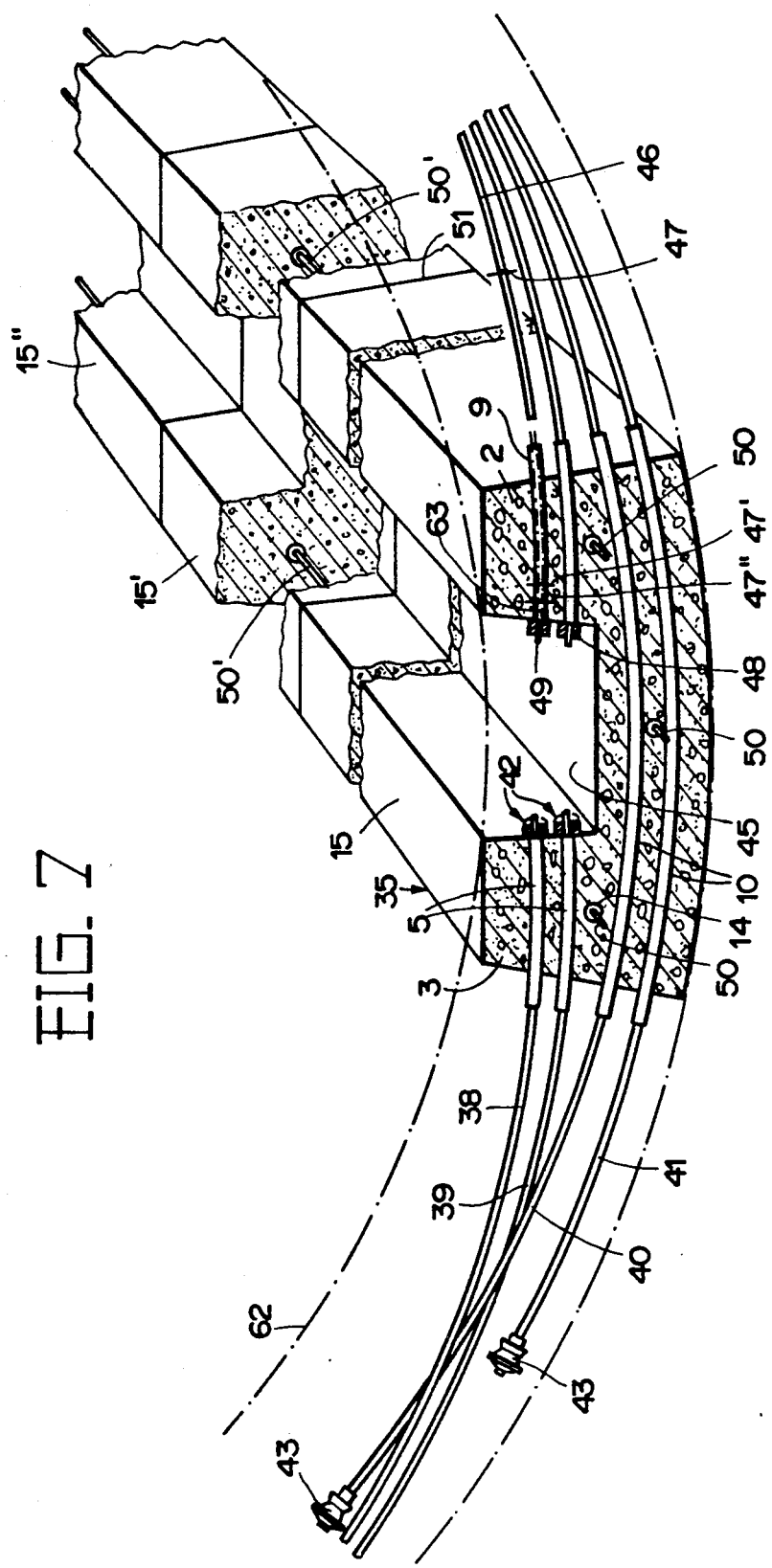

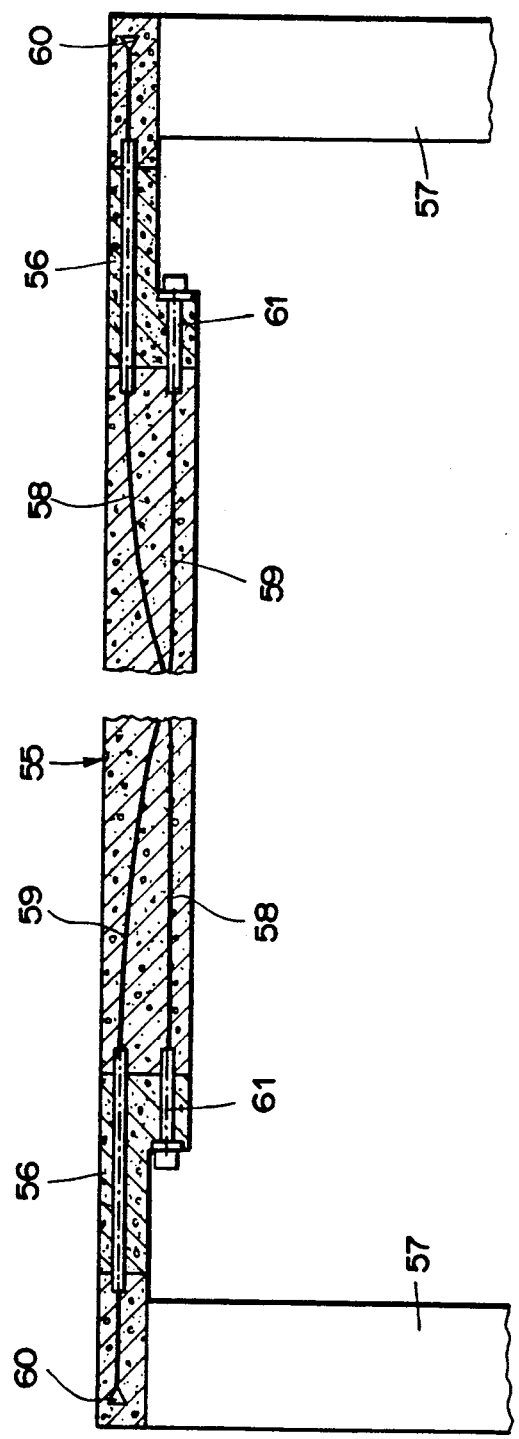

PRESTRESSED CONCRETE LINING IN A PRESSURE TUNNEL

The present invention concerns a prestressed concrete lining in a pressure tunnel with several reinforcement elements distributed around the circumference and along the pressure tunnel and bordering at least partially on each other, with prestressing elements which encompass at least a part of the circumference of the pressure tunnel, with stressing anchorages to stress the prestressing elements, the stressing anchorages being accessible from the inside of the tunnel at least during the construction of the pressure tunnel, and with a bottom part extending along the length of the pressure tunnel, formed of several individual elements in series, whose side surfaces are each bordered by reinforcement elements.

In mountainous terrain, pressure tunnels cannot usually be provided with a uniform lining along their whole length since the latter must be adapted to the prevalent nature of the mountainous terrain. The currently known usual methods for constructing linings are:
 shotcrete lining
 unreinforced concrete lining
 reinforced concrete lining
 steel casing with concrete backfill and
 prestressed concrete lining An investigation usually carried out in advance shows which lining should be selected for which partial areas of a pressure tunnel to be constructed in mountainous terrain. The lining of pressure tunnels is a skin which is embedded in the material of the mountainous terrain (rock). In all these pressure tunnels the material of the mountainous terrain is an integral part of the overall construction as an encasing support. The static interrelations in this composite body necessitate an evaluation of the different stress influences. It is therefore necessary for example, to decide before beginning construction whether the nature and overlie of the mountainous terrain allow use to be made of the rock.

A further consideration is that the quality of the cutting technology for constructing the tunnel and the casing and concreting technology have developed to such a degree that the procedures involved in the installation of steel reinforcements with concrete backfill or the use of prestressed concrete lining have been less and less able to keep up with the pace at which the work advances. It is however desirable that the above-mentioned methods for constructing linings can be quickly adapted to unforeseen and/or changing conditions in the mountainous terrain. Yet, due to the usual delivery deadlines it is scarcely possible to fulfil this requirement by constructing additional steel reinforcements. However, in the case of prestressed concrete lining, there is nothing to stand in the way of adaptability.

Both processes show moreover that they are a hindrance to rapid advancement in the excavation of the tunnel and in concreting. The steel casing must be inserted into the tunnel as an awkward object and must be welded together on the spot. Even a prestressed concrete lining of the current state of the art presents similar problems, depending on the demands to be met. Often, recesses distributed across the circumference of the tunnel have to be constructed to take up the stressing elements and then provided on the spot with additional reinforcements. This work considerably impairs a speedy advance in the progress of the construction.

It is therefore the object of this invention to present a way of constructing a pressure tunnel with a prestressed concrete lining in a more simplified manner with respect to the state of the art outlined above. It is a further aim of the invention to allow as much as possible of the work which can be done outside a pressure tunnel, to be carried out outside the tunnel. The construction time should be reduced and the progress of the construction accelerated.

According to the invention, the solution to this object results from the fact that each of the individual elements is an anchorage body, that each of the anchorage bodies has an essentially U-shaped cross section, that in each of the arms of the anchorage bodies turned towards the inside of the tunnel there are first means for passing through at least one of each of the prestressing elements, a bearing plate being disposed on the facing inner surfaces of the arms in the area of each of the first pass-through means, that in the base of the arm there are second means for passing through at least one of each of the prestressing elements and that each of the prestressing elements, starting from a dead end anchor, is fed through one of the second pass-through means of one of the anchorage bodies and, after crossing through one of the first pass-through means of one of the anchorage bodies, ends in an anchor head of a stressing anchorage abutting on one of the bearing plates.

Preferred forms of embodiment of the concrete lining are disclosed in the dependent patent claims.

The prestressed concrete lining according to the invention has the following advantageous features:

The anchorage bodies can be used as elements of the bottom part during the construction of the pressure tunnel to carry and form a surface for construction machines and material transport equipment, and, because of their U-shape, can also be used for draining the pressure tunnel during its construction.

Where necessary, the anchorage bodies can be additionally distributed over the circumference of the pressure tunnel, for example, above and below. This removes the necessity of constructing the recesses already mentioned and of subsequently concreting the same.

The positioning work for the prestressing elements and the stressing anchors is simplified.

The prestressing elements are better protected against corrosion.

The anchorage bodies can be fabricated outside the pressure tunnel. Mutual hindrance caused by various work being carried out inside the pressure tunnel is reduced.

Figure 2:
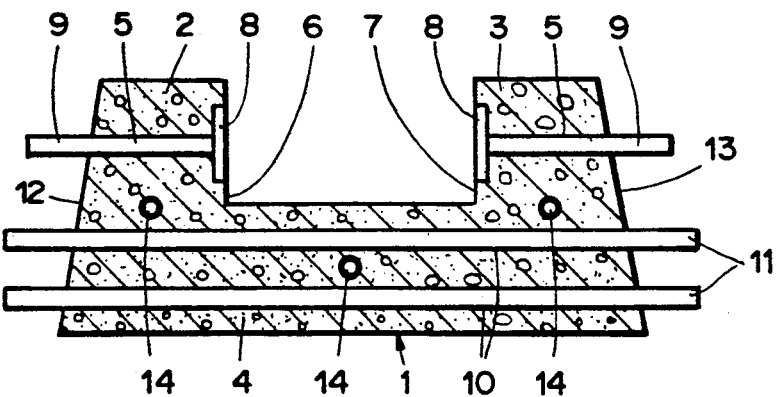
Figure 3:
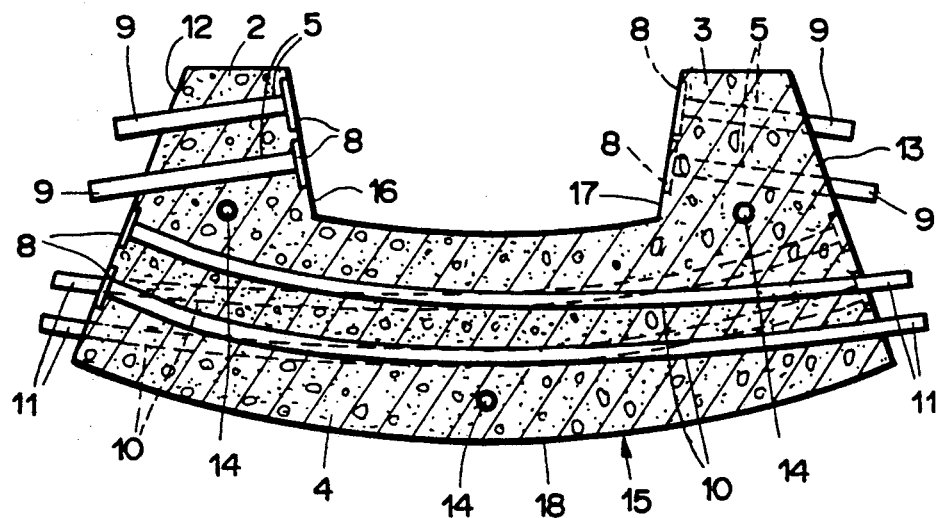
Figure 4:
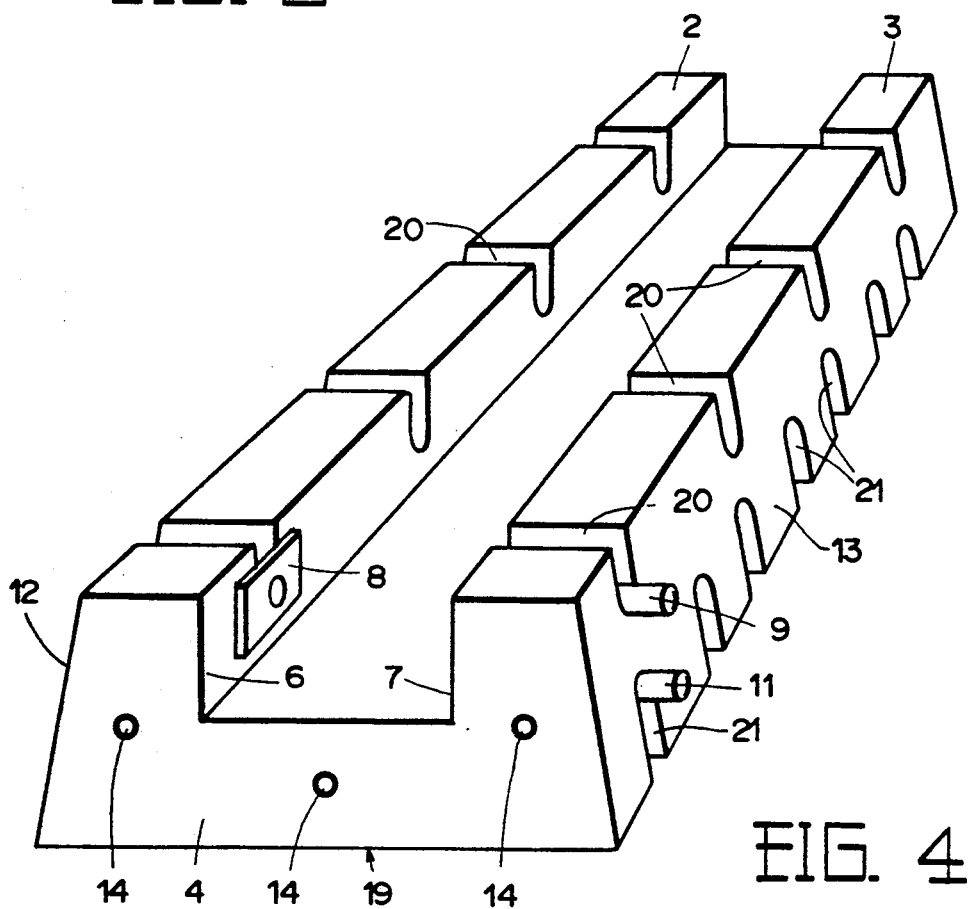
Figure 5:
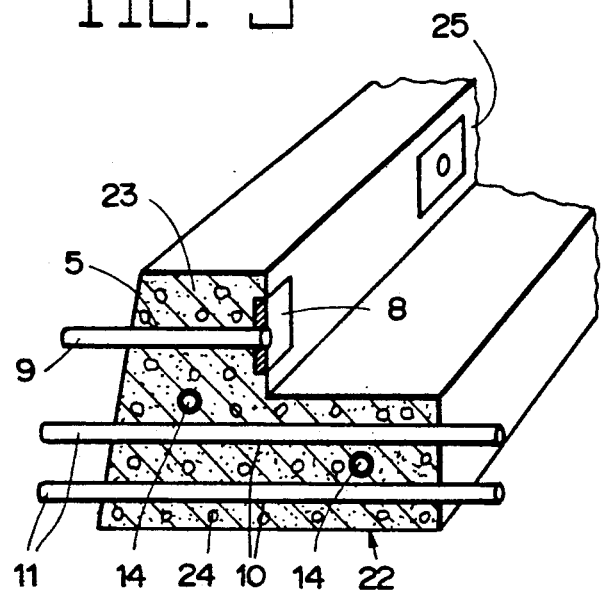
Figure 8:
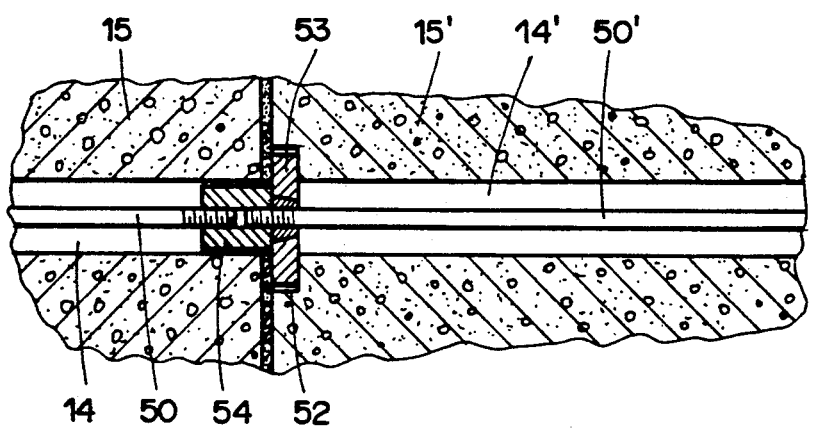
Figure 6:
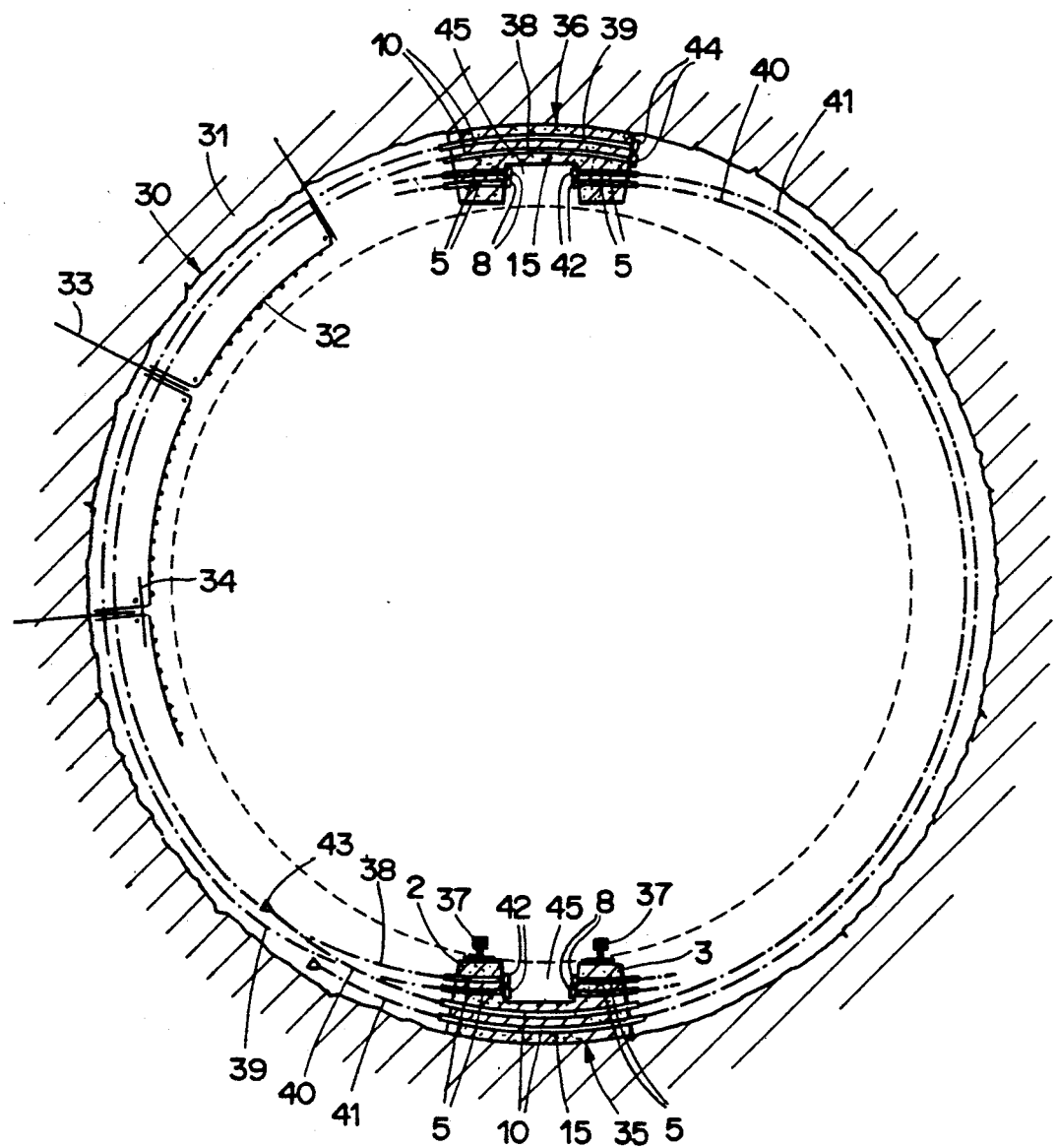

The invention is described below with the aid of figures, which show:

FIG. 1 a perspective view of a first embodiment of an anchorage body,

FIG. 2 a cross section through the anchorage body shown in FIG. 1,

FIG. 3 a cross section through a second embodiment of an anchorage body,

FIG. 4 a perspective view of a third embodiment of an anchorage body,

FIG. 5 a fourth embodiment of an anchorage body,

FIG. 6 a cross section through a pressure tunnel with anchorage bodies and prestressing elements disposed therein, FIG. 7 an enlarged section of the pressure tunnel cross section of FIG. 6 showing additional anchorage bodies in series, FIG. 8 a detailed diagram to show the lengthwise prestressing of anchorage bodies in series and FIG. 9 an example of the arrangement of the anchorage bodies and prestressing elements for prestressing a level slab.

FIGS. 1 to 4 show anchorage bodies used in preference in the construction of pressure tunnels. They can however also be used in the production of curved walls, of containers, for example. In FIGS. 1 and 2, 1 denotes a first form of embodiment of one of the anchorage bodies. It consists of an elongated body produced from reinforced concrete. In cross section, the element is essentially U-shaped, has two similarly directed arms 2, 3 at a distance from each other, which are connected with each other at their base by a base arm 4. Each of the arms 2, 3 is formed such that there are several first pass-through openings 5, running therein in the crosswise direction, to pass a prestressing element through each one. The first pass-through openings 5 are disposed at more or less regular intervals from each other with respect to the lengthwise direction of both arms 2, 3. The facing inner surfaces 6, 7 of the two arms 2, 3, whose inner surfaces run approximately parallel to each other in this example, each have in this example a concreted-in bearing plate 8 in the area of each of the first pass-through openings 5. The bearing plate is intended so that an anchor head can be affixed to it to prestress the prestressing element fed through the first pass-through opening 5.

As shown in FIG. 2, which represents a cross section through the anchorage body of FIG. 1, the bearing plates are each connected with a first pass-through duct 9. Since both the bearing plate 8 and the pass-through duct 9 are each made of a steel material, the said connection is preferably a welded joint. In the area of the bases of the two arms 2, 3 there are second pass-through openings 10 running in the crosswise direction to the anchorage body 1, which are sheathed with second, preferably steel pass-through ducts 11. Along the length of the anchorage body there are also several second pass-through openings 10 disposed at more or less regular intervals. These second pass-through openings 10 are also intended for passing through prestressing elements, as will be shown further on. On the outwardly facing surfaces 12, 13 of the two arms 2, 3 there are the first and second pass-through ducts 9, 11 to form advantageously a reinforcement block, with a reinforcement abutting against the anchorage body. The bearing plate 8 with the welded on first pass-through duct 9 forms together a part of a stressing anchorage. The pass-through ducts 9 and 11 are also intended for partial reinforcement in the anchorage body 1. 14 designates openings running in the lengthwise direction, in which ducts are also disposed. These also serve for partial reinforcement of the anchorage body and for passing through stressing rods or prestressing elements, for the lengthwise prestressing of several anchorage bodies disposed one behind the other. Additional reinforcements are not shown in the figures.

FIG. 3 shows the cross section of a second embodiment of an anchorage body 15. The reference numerals of identical parts, or parts with the same function as parts already described in FIGS. 1 and 2, have been retained. This second form of embodiment of an anchorage body 15 is particularly suited for the production of pressure tunnels. It is immediately striking that the external surface 18 of the base arm 4 is rounded, preferably with a radius which corresponds to that of the pressure tunnel to be constructed. The inner surfaces 16, 17 of the two arms 2, 3 incline towards each other in a V-shape. Disposed across the top of each of the arms 2, 3 in this embodiment example, are two overlapping bearing plates 8 and first pass-through ducts 9. The inclination of the inner surfaces 16, 17 of the two arms 2, 3 enables the direction in which the first pass through ducts 9 leave the anchorage body 15 to be determined. As is shown in more detail at a later point, this is preferably selected such that the prestressing elements running around the pressure tunnel are subjected to the least possible change in radius in order to avoid additional frictional losses. The same also applies to the arrangement of the second pass-through ducts 11, which, in this anchorage block, is also kept such that the prestressing elements passed through change as smoothly as possible to a prestressing element radius adapted to the radius of the pressure tunnel. In this embodiment example, the second pass-through ducts 11 also have a bearing plate 8 on the one side. This is intended for affixing an anchorage head to form a dead end anchorage for the prestressing elements subsequently passed through.

FIG. 4 shows a third form of embodiment of an anchorage body 19. It has essentially the same shape as that shown in FIGS. 1 and 2. However, in this embodiment example, instead of the pass-through openings 9, 10, there are recesses 20, 21, which are intended for passing through the prestressing elements. Each of the prestressing elements can also be passed through a pass-through duct 9 which is welded on one side with a bearing plate 8, and positioned in one of the indents 20. Here too, the pass-through duct 9 with the bearing plate 8 forms a part of a stressing anchorage and can be used for partial reinforcement of the anchorage body, particularly following the concreting-in of the latter. As in the first embodiment example, second pass-through ducts 11, which are positioned in the lower recesses 21, can be used for passing prestressing elements through the base arm 4. It would also be feasible to arrange the recesses formed with reinforcement elements in such a way that the pass-through ducts would no longer be necessary. These reinforcement elements on the external sides 12, 13 of the arms would advantageously be formed to project outwards, in order to form the previously mentioned reinforcement block with the reinforcement abutting against the anchorage body 19.

FIG. 5 shows a fourth form of embodiment of an anchorage body 22 which is essentially L-shaped in its cross section. The one arm 23 has a first pass-through opening 5 running in its crosswise direction, to pass through a prestressing element. This pass-through opening is also fitted with a bearing plate 8 and a first pass-through duct 9, as shown in FIGS. 1 and 2. The bearing plate 8 and the pass-through duct 9 are also welded to one another, have been concreted into the anchorage body 22, form parts of a stressing anchorage and are also intended for partial reinforcement of the anchorage body. Other pass-through openings 10 are disposed in the other arm 24, and run approximately parallel to the pass-through opening 5. Ducts, namely second pass-through ducts 11 are also present in these pass-through openings. This anchorage body, which, above all, is suited to the fabrication of slabs, decks, supports and casings, corresponds essentially to the anchorage body 1, which was described with the aid of FIGS. 1 and 2, the arm 3 not being shown.

Other forms of embodiments of anchorage bodies not described here, made for example from materials other than reinforced concrete, for the most varied of applications in prestressing technology and for the most varied of constructions, are possible. In the following, the use of anchorage bodies in the construction of pressure tunnels is described in particular, since it is there that the advantageous features quoted at the beginning are especially effective.

FIG. 6 shows a cross section through a pressure tunnel 30 prior to the introduction of the floor. 31 designates the rock surrounding the pressure tunnel, 32 the reinforcement elements, for example, reinforcement cages as usually constructed for reinforcing pressure tunnels, distributed over its circumference and preferably fixed in the rock 31 with rock plugs 33. 34 designates a rod which forms the reinforcement block between two adjacent reinforcement cages. The anchorage bodies 15, of which the figure shows only the front of one and which are preferably prefabricated outside the pressure tunnel prior to or during the rock excavation as the pressure tunnel is constructed, are connected to each other in the pressure tunnel as the excavation of the rock advances, connected lengthwise to each other by prestressing and serve as the bottom part 35. The two arms 2, 3 are thereby formed such that tracks 37, which serve to move construction machinery along the tunnel, can be mounted on each surface turned away from the base. The groove 45 between the inner surfaces of the two arms is used during the construction of the pressure tunnel as a trench for water drainage.

In the figure illustrated, other anchorage bodies 15, of which also only the front of one is visible, are affixed in series to one another on the wall lying opposite the bottom part and form an anchorage body 36. Prestressing elements 38, 39, of which there are a multiplicity along the length of the tunnel, are fed at one end through the first pass-through openings 5 into the anchorage body 15 belonging to the bottom part and run along the wall of the pressure tunnel through the reinforcement cages 32 to a further anchorage body 15, which is a part of the anchorage block 36, are there fed through its second pass-through openings 10 and each end on exiting from the anchorage body 15 of the anchorage block 36 in a dead end anchorage 44. Other prestressing elements 40, 41 are fed through one arm of the anchorage body 15 of the anchorage block 36, run along the pressure tunnel wall lying opposite the first mentioned prestressing elements to the anchorage body 15 of the bottom part 35, pass there through the second pass-through openings 10 and end in a dead end anchorage 43, distanced for example, from the anchorage body 35. The trenches 45 resp. the intervals of the arms and dimensions of the anchorage bodies 15 used, are calculated such that after concreting, a prestressing jack can be set to the stressing anchorages 42 to prestress the prestressing elements. Compared with earlier embodiments with anchorage recesses, where the prestressing jack had to be used outside the recess and the prestressing element was for example wound around a curved stressing chair, causing large frictional losses during prestressing, the stressing elements can be individually prestressed with the anchorage bodies practically without the above-mentioned frictional losses. Thereby, smaller prestressing jacks can be used. It can also be seen from FIG. 6 that the anchorage bodies can be constructed in such a way that the prestressing elements are movable with a practically constant radius. This is also positive with respect to minimizing the frictional losses.

FIG. 7 shows a perspective view of the anchorage bodies 15, 15' and 15", arranged behind each other in series, which served as the bottom part 35 during the construction of the pressure tunnel. 42 designates the stressing anchorages and 43 the fixed anchorages. Also visible in the figure are the previously described prestressing elements 38, 39, 40, 41. 46 signifies an additional stressing element, with the aid of which the introduction into the anchorage body 15 and the prestressing can be explained. Before introduction of the prestressing element 46, which in this example is shown as a single strand with a plastic coating, into the first pass-through opening 5, an incision is made in the plastic coat at a point 47, lying outside the anchorage body 15. The prestressing element is fed into the appropriate first pass-through opening 5 of the anchorage body 15 and projects outwards on the inside of the corresponding arm. The incision is now located for example at point 47' within the metal duct 9. The foremost plastic coating is removed and an anchor head 48 is pushed over the exposed strand 49. Using a prestressing jack, the tendon is prestressed and locked in the stressing head. The end of the plastic coating is now at point 47", just before the anchor head 48. To achieve a self-contained corrosive protection, the remaining hollow space 63 between the anchor head and the plastic sheathing is filled with an injected material. After the stressing elements have been prestressed, the grooves 45 can be concreted up and adapted to the concrete wall 62.

FIG. 7 also shows prestressing rods 50, 50' with which several anchorage bodies 15, 15', 15" disposed behind each other in series, are connected with each other under prestressing as already shown, during, for example, the excavation of the pressure tunnel. Such a connection point of two anchorage bodies 15, 15' is shown in more detail in FIG. 8, for example. The lengthwise opening 14' of the anchorage body 15' has for example an expansion 52 at one end, into which a bearing plate 53 is positioned just prior to connecting up the next anchorage element 15 or is already cast in the concrete during the fabrication of the anchorage bodies. The stressing rod 50' which is fed through the bearing plate 53, is prestressed in a known way and manner and is for example locked with the bearing plate 53. The end of the stressing rod 50' has for example a thread, over which a rod coupling nut 54 is screwed. The dimensions of this nut are such that it fits in the lengthwise opening 14 of the anchorage body 15 now to be joined on. After joining on the anchorage body 15, a further stressing rod 50 is pushed through the pass-through opening 14 and screwed into the rod coupling nut 54 until it abuts the rod 50'. On the impact surfaces between two anchorage bodies 15, 15' an adhesive mortar is preferably applied. The additional rod 50 can then be prestressed as already described. In this way the anchorage blocks formed from several anchorage bodies are constructed.

For the sake of completeness, FIG. 9 also shows the arrangement of anchorage bodies according to the previously described FIG. 5 following the construction of a flat slab or deck. On both sides of the deck there are anchorage bodies 56, which may lie partially on a support construction 57. A first prestressing element 58 has a dead end anchorage 60 at its right end in the figure, is fed through the right anchorage body 56 and ends in a stressing anchorage 61 of the left prestressing element 56. A second prestressing element 59 ends on its left side in a dead end anchorage 60, is fed through the left anchorage body 56 and ends on its right side in a stressing anchorage 61 of the right anchorage body 56. The deck 55 is shown in its finished state after concreting, without a casing. For the sake of clarity, the other necessary reinforcement irons are not shown.

The previous embodiment examples have always taken as a starting point a single greased strand provided with a plastic sheathing. However, by appropriate dimensioning of the first and second pass-through openings and/or recesses, it is equally possible, if the stressing force requires, to use as prestressing elements several individual strands drawn together into a bunch. It goes without saying that the accompanying dead end anchorages and stressing anchorages are then formed accordingly.

In the same way as in the embodiment examples described, through the use of anchorage bodies, curved slabs or walls can be prestressed in a relatively simple and economical manner.

What is claimed is:

1. A prestressed concrete lining in a pressure tunnel, with several reinforcement cages (32) distributed around the circumference and along the pressure tunnel and bordering at least partially on each other, with prestressing elements (38, 39, 40, 41), which encompass at least a part of the circumference of the pressure tunnel, with stressing anchorages (42) to stress the prestressing elements, the stressing anchorages being accessible from the inside of the tunnel, and with a bottom part (35) extending along the length of the pressure tunnel, formed of several individual anchorage bodies in series, whose side surfaces are each bordered by reinforcement cages, wherein each of the anchorage bodies (1, 15, 19) has an essentially U-shaped cross section with a pair of extending arms at a distance from each other which are connected with each other at their base by a base arm, wherein each of the extending arms (2,3) of the anchorage bodies turned towards the inside of the tunnel there are a first pass-through means (5,20) for at least one of each of the prestressing elements (38, 39, 40, 41), a bearing plate (8) being disposed on the facing inner surfaces of the arms in the region of each of the first pass-through means (5, 20), and wherein the base arm there are second means (10, 21) for passing through at least one each of the prestressing elements (38, 39, 40, 41), starting from a dead end anchor (43), is fed through one of the second pass-through means (10, 21) of one of the anchorage bodies and, after crossing through one of the first pass-through means (5, 20) of one of the anchorage bodies, ends in an anchor head (48) of a stressing anchorage (42) adjacent to one of the bearing plates (8).

2. A concrete lining according to claim 1, wherein each of the anchorage bodies (1, 15, 19) has at least one opening (14) running through in the lengthwise direction and wherein the individual anchorage bodies are connected to each other by way of stressing means (50) running through the said openings.

3. A concrete lining according to claim 1, wherein an anchorage block (36) is formed with additional anchorage elements (1, 15, 19) in series, wherein one or several anchorage blocks (36) are disposed at intervals around the circumference of the pressure tunnel, there being at least one reinforcement element (32) in the circumferential direction of the pressure tunnel between two adjacent anchorage blocks (36) and/or the bottom part (35) and an anchorage block (36) adjacent thereto.

4. A concrete lining according to claim 1, wherein the prestressing elements (38, 39, 40, 41) comprise plastic sheathed mono-strands provided with a full corrosion protection which extends into the first pass-through means (5, 20).

5. A concrete lining according to claim 1, wherein the prestressing elements (38, 39, 40, 41) comprise several strands placed in ducts.

6. A concrete lining according to claim 1, wherein the anchorage bodies (1, 15, 19) are prefabricated from reinforced concrete and can be placed in the pressure tunnel during the construction of the pressure tunnel.

7. A concrete lining according to claim 1, wherein the first pass-through means (5) of the anchorage bodies (1, 15, 19) are pass-through openings.

8. A concrete lining according to claim 1, wherein the first pass-through means (20) of the anchorage bodies (1, 15, 19) are recesses.

9. A concrete lining according to claim 1, wherein the second pass-through means (10) of the anchorage bodies (1, 15, 19) are pass-through openings.

10. A concrete lining according to claim 1, wherein the second pass-through openings (21) of the anchorage bodies (1, 15, 19) are recesses.

11. A concrete lining according to claim 1, wherein the first pass-through means (5, 20) are each provided with a first metal duct (9) and wherein at least one part of the first metal ducts (9) on the side turned away from the bearing plate (8) are disposed to project outwards from the anchorage elements (1, 15, 19).

12. A concrete lining according to claim 1, wherein the second pass-through means (10, 21) are each provided with a second metal duct (11) and wherein at least one part of the second metal ducts (11) at least on one side are disposed to project outwards from the anchorage bodies (1, 15, 19).

13. A concrete lining according to claim 1, characterized in that the first pass-through means (5, 20) and/or the second pass-through means (10, 21) are disposed at approximately regular intervals in relation to the lengthwise direction of each of the anchorage bodies (1, 15, 19).

* * * * *